(12) United States Patent
Gillecriosd

(10) Patent No.: US 8,210,772 B2
(45) Date of Patent: Jul. 3, 2012

(54) SOIL VAPOR EXTRACTION REMEDIATION SYSTEM WITH VAPOR STREAM SEPARATION

(75) Inventor: Marsaili Gillecriosd, Monrovia, CA (US)

(73) Assignee: Antea USA, Inc., Shoreview, MN (US)

( * ) Notice: Subject to any disclaimer, the term of this patent is extended or adjusted under 35 U.S.C. 154(b) by 307 days.

(21) Appl. No.: 12/459,584

(22) Filed: Jul. 2, 2009

(65) Prior Publication Data
US 2010/0239373 A1 Sep. 23, 2010

Related U.S. Application Data

(60) Provisional application No. 61/210,907, filed on Mar. 23, 2009.

(51) Int. Cl.
B09C 1/00 (2006.01)
(52) U.S. Cl. ..................... 405/128.2
(58) Field of Classification Search ............... 405/128.1, 405/128.2, 128.25, 128.45
See application file for complete search history.

(56) References Cited

U.S. PATENT DOCUMENTS

| | | | |
|---|---|---|---|
| 2,944,092 A | 7/1960 | Felderbauer, Jr. et al. | 260/676 |
| 4,730,672 A | 3/1988 | Payne | 166/266 |
| 4,765,902 A | 8/1988 | Ely et al. | 210/610 |
| 4,832,122 A | 5/1989 | Corey et al. | 166/266 |
| 4,850,745 A | 7/1989 | Hater et al. | 405/258 |
| 4,857,084 A | 8/1989 | Robbins et al. | 55/58 |
| 4,945,988 A * | 8/1990 | Payne et al. | 405/128.45 |
| 5,221,159 A | 6/1993 | Billings et al. | 405/128 |
| 5,246,309 A | 9/1993 | Hobby | 405/128 |
| 5,300,137 A * | 4/1994 | Weyand et al. | 405/128.85 |
| 5,358,357 A * | 10/1994 | Mancini et al. | 405/128.2 |
| 5,384,048 A | 1/1995 | Hazen et al. | 210/605 |
| 5,441,365 A * | 8/1995 | Duffney et al. | 405/128.4 |
| 5,575,589 A | 11/1996 | Suthersan | 405/128 |
| 5,584,605 A | 12/1996 | Beard et al. | 405/128 |
| 5,593,248 A * | 1/1997 | Kansa et al. | 405/128.45 |
| 5,709,505 A | 1/1998 | Williams et al. | 405/258 |
| 5,829,918 A | 11/1998 | Chintis | 405/128 |
| 5,874,001 A | 2/1999 | Carter | 210/610 |
| 6,183,628 B1 | 2/2001 | Baker et al. | 208/100 |
| 6,913,419 B2 | 7/2005 | Shiau | 405/128.25 |
| 7,442,305 B2 | 10/2008 | Wu | 210/610 |
| 2003/0082382 A1 | 5/2003 | Hiltzik et al. | 428/403 |
| 2005/0166581 A1 | 8/2005 | Davis et al. | 60/295 |
| 2006/0094106 A1 | 5/2006 | Priester III, et al. | 435/244 |

OTHER PUBLICATIONS

Ritter, James et al. "New Vacuum Swing Adsorption Cycles for Air Purification with the Feasability of Complete Cleanup". I&ECresearch. *ACS Publications*. 1998. <http://pubs.acs.org/doi/ffull/10.1021/ie970685K>.

(Continued)

*Primary Examiner* — John Kreck
(74) *Attorney, Agent, or Firm* — Robert M. Wallace

(57) ABSTRACT

A soil remediation system comprises an in-ground extraction well and separation apparatus connected to receive extracted soil vapors from the extraction well. The separation apparatus comprises plural pressure swing adsorption (PSA) components, respective ones of the PSA components containing a respective adsorption medium adapted to adsorb a respective species contained in the extracted soil vapors, the plural PSA components being connected in a serial succession to provide respective desorbed species flow streams of the respective species from the respective PSA components, some of the species being re-injected into the ground.

25 Claims, 9 Drawing Sheets

OTHER PUBLICATIONS

Unknown. "Pressure Swing Adsorption for Product." Chemicals Project Fact Sheet. *U.S. Department of Energy*. Feb. 2001. <www.oit.doe.gov/chemicals>.

Unknown. "Pressure Swing Adsorption Recovery System." Case Study. *U.S. Department of Energy*. <www.eere.energy.gov>.

Unknown. "PSA Nitrogen Gas Generator Technology". *Mellcon*. http://www.mellcon.com/PSA_Nitrogen.html>.

Unknown. "Pressure swing adsorption". *Wikipedia Encyclopedia*. <http://en.wikipedia.org/wiki/Pressure_swing_adsorption>.

Unknown. "Gas separation". *Wikipedia Encyclopedia*. <http://en.wikipedia.org/wiki/Gas_separation>.

Unknown. Evaluation of a MEGASORB Pressure Swing Adsorption (PSA) Unit Designed to Capture Perfluorocompounds (PFCs) (ESHC002A). *SEMATECH Technology Transfer*. Dec. 31, 1996. <http://www.sematech.org>.

Unknown. "Carbon dioxide recovery by vacuum swing adsorption." *Science Direct*. Dec. 9, 2003 <http://www.sciencedirect.com/science?_ob=Article URL&_udi=B6THJ_4BP9PWH-5&_user=10&_rdoc=1...>.

Unknown. "Oxygen Producing Vacuum Pressure Swing Adsorption (VPSA) System." *PRAXAIR*. <http://www.praxair.com/>.

Baker, Richard W. "Membranes For Vapor/Gas Separation." *Membrane Technology and Research, Inc*. pp. 1-25.

Nijmeijer, Arian. "Current status of membranes development for gas separation." Shell *Global Solutions*, pp. 1-28.

Hall, Thomas. "The SORBATHENE ® Unit for Volatile Organic Vapor Recovery." *The Dow Chemical Company*, 1993, pp. 1-9.

Unknown. "Gasoline Vapor Recovery." *Membrane Technology & Research*. 2007. <http://www.mtrinc.com/gasoline_vapor_recovery.html>.

Unknown. "Teflon® AF Applications." *Applications for DuPont Teflon AF*. 2009. <http://www2.dupont.com/Teflon_Industrial/en_US/products/product_by_name/teflon_af/apps.html>.

Pezolt, Daniel, et al. "Pressure Swing Absorption for VOC recovery at gasoline loading terminals." *Wiley Interscience*. 2006. <http://www3.interscience.wiley.com/journal/112735861/abstract?CRETRY=1&SRETRY=0>.

Unknown. "Silican Gel Desiccant" *Delta Adsorbents*. 2002. <http://www.deltaadsorbents.com/silica_gel.php>.

Matsumoto, Kenji, et al. "Membrane Process for Organic Vapor Recovery from Air." *Polymer Journal*. 1991. <http.www.jstage.jst.go.jp/particle/polymj/23/5/23_491/article>.

Tasselli, Franco, et al. "Novel composite hollow fibre gas separation membranes with high selectivity and improved solvent resistance." *Desalination 200*, 2006, pp. 61-63.

Unknown. "BORSIG Experience & Innovation." *BORSIG Membrane Technology*. <http://www.borsig-mt.com/>.

Liu, Yujun, et al. "Simulation of gasoline vapor recovery by pressure swing adsorption." *CAT.INIST*2000. <http://cat.inist.fr/?aModele=afficheN&cpsidt=1539204>.

Unknown. "PERMEATOR™," *ARID Technologies, Inc*., pp. 1-7.

Unknown. "VST ENVIRO-LOC™ ELS Membrane Processor—The Safeguard of Enhanced Vapor Recovery (EVR)." *Vapor Systems Technologies, Inc, IOM*/Section 5, pp. 5-1-5-7.

Unknown. "Introduction to PSA." *ESSELINK BV*. <http://www.esselinkbv.com/maintext.htlm>.

Unknown "AS-K PSA Oxygen Generator." *AirSep Corporation*, Feb. 2004, pp. 1-2.

Unknown "Oxygen Sparge Systems". *H20 Engineering*.

Unknown. "Vapor Recovery." *Jordan Technologies*. <http://www.jordantech.com/vapor/cbasic.htm>.

Tuttle, Nicholson W., et al. "Design Considerations For Pressure Swing Carbon Adsorption Vapor Recovery." *Warner Nicholson Engineering Consultants*. 2007. <http://www.vaporrecovery.com/ilta951.htlm>.

\* cited by examiner

| | Adsorption | Desorption |
|---|---|---|
| Valve 400 | Open | Closed |
| Valve 405 | Closed | Open |
| Pump 410 | Higher Pressure | Lower Pressure |
| Valve 420 | Open | Closed |
FIG. 5
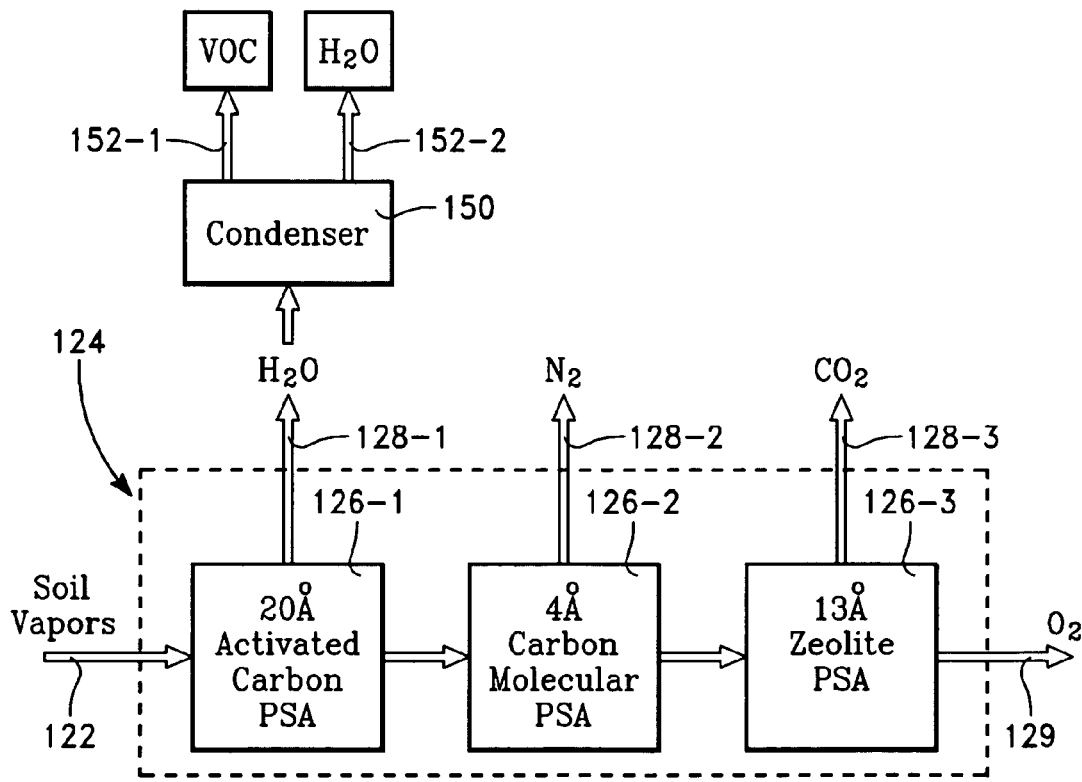
FIG. 6
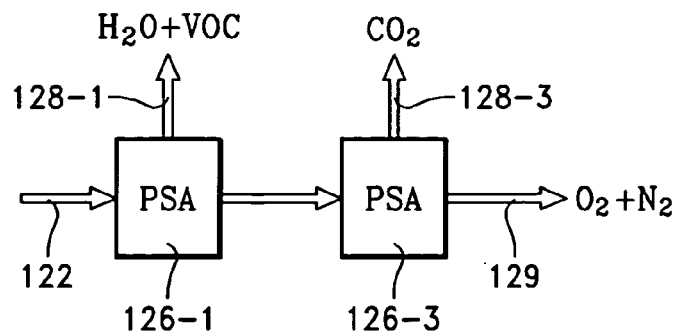
FIG. 7

SOIL VAPOR EXTRACTION REMEDIATION SYSTEM WITH VAPOR STREAM SEPARATION

CROSS-REFERENCE TO RELATED APPLICATIONS

This application claims the benefit of U.S. Provisional Application Ser. No. 61/210,907, filed Mar. 23, 2009 entitled SOIL VAPOR EXTRACTION REMEDIATION SYSTEM WITH VAPOR STREAM SEPARATION, by Marsaili Gillecriosd.

BACKGROUND

Soil vapor extraction is employed for sub-surface soil and ground water remediation in locations that have been contaminated, for example with volatile organic compound contaminants. Soil remediation is often required to remove contamination from soils and ground water where underground gasoline storage tanks have leaked. Typically, remediation is performed by extracting soil vapors through one or more extraction wells that have been drilled and screened in the unsaturated soils (vadose zone). The extracted soil vapors are then treated in a thermal oxidization apparatus, which may be a gas flame burner or a gas or electrically heated catalytic oxidizer, whose products are released. Alternatively, the extracted soil vapors may be treated with a carbon adsorber, requiring the carbon material to be regenerated on-site or off-site or replaced periodically. One problem with the approach using the thermal oxidation apparatus is that the oxidation gas products must be released into the atmosphere to avoid further treatment and expense, and the release must be limited to conform with legal or regulatory requirements. Recent developments indicate that any release, particularly of carbon dioxide components of the oxidation gas products, may eventually be prohibited or limited to such an extent that this process may become unfeasible. One problem with the approach using a carbon adsorber is that periodic regeneration or replacement of the carbon adsorber can be prohibitively expensive for remediation sites having high volatile organic compound concentrations in the extracted soil vapors.

Another technique for remediation is to inject oxygen gas into the ground water through a sparging well, in order to enhance the population of beneficial bacteria for biodegradation of the volatile organic compounds contaminating the ground water or soil. One problem with this approach is that injection of oxygen or any gas increases the pressure in the soil, and at high flow rates can lead to escape of fugitive gases through the soil surface into the atmosphere.

There is a need for a soil and ground water remediation process that does not suffer from any of the problems or disadvantages noted above. For example, there is a need for a soil remediation process that prevents escape of fugitive gases through the soil surface. There is a need for a soil remediation process that does not generate undesirable products, such as oxidation gas products. There is a need for a soil remediation process that does not require replacement or chemical/thermal regeneration of an adsorber material such as a carbon adsorber.

SUMMARY

A soil remediation system is provided comprising an in-ground extraction well, and a separation apparatus connected to receive extracted soil vapors from the extraction well and comprising separation components, respective ones of the separation components adapted to separate a respective species contained in the extracted soil vapors. The plural separation components are connected in a succession to provide respective separated species flow streams of the respective species from the respective separation components. The system further comprises a collector apparatus coupled to receive the separated species flow stream of a first species from a first one of the separation components, and a first dispersion apparatus comprising one of (a) an in-ground injection well or (b) an atmospheric vent, the first dispersion apparatus coupled to receive the separated species flow stream of a second species from a second one of the separation components.

In one embodiment, the first species comprises water vapor and volatile organic compound gases, and the collector apparatus comprises a condenser having a volatile organic compound gas outlet and a separate water outlet. The first separation component may be adapted to separate volatile organic compound gases and water vapor to respective separated species flow streams while not separating remaining species in the soil vapors.

The second species may be one gas comprising nitrogen, carbon dioxide or oxygen. In this case, the second separation component is adapted to separate the one gas to a respective separated species flow stream while not separating species in the soil vapors that remain after removal of the volatile organic compound gases, the water vapor and the one gas.

The system may further comprise a second dispersion apparatus comprising one of (a) an in-ground injection well or (b) an atmosphere vent, the second dispersion apparatus coupled to receive the separated species flow stream of a third species from a third one of the separation components, and the third species comprises an other gas constituting another one of nitrogen, carbon dioxide or oxygen. In this case, the third separation component is adapted to separate the other gas to a respective separated species flow stream while not separating species in the soil vapors that remain after removal of the volatile organic compound gases, the water vapor, the one gas and the other gas.

The system may further comprise a third dispersion apparatus comprising one of (a) an in-ground injection well or (b) an atmosphere vent, the further dispersion apparatus coupled to receive a residual gas flow stream of a fourth species from the third one of the separation components, and the fourth species comprises the remaining one of nitrogen, carbon dioxide or oxygen. In one implementation, the second species is nitrogen, the third species is carbon dioxide and the fourth species is oxygen.

The system may further comprise a pump coupled between the extraction well and the inlet.

The system may further comprise a fourth dispersion apparatus comprising one of (a) an in-ground injection well or (b) an atmosphere vent, the fourth dispersion apparatus coupled to receive a residual gas flow stream of a third and fourth species from the second one of the separation components, in which case the first species comprises volatile organic compound gases and water vapor, the second species comprises carbon dioxide and the third and fourth species comprise nitrogen and oxygen.

In one embodiment, each one of the separation components comprises a pressure swing adsorption component comprising a vessel and a respective adsorption medium in the vessel adapted to adsorb the respective species, and a pump coupled to the vessel and operable in successive adsorption and desorption phases.

In an embodiment, at least one of the separation components comprises first and second pressure swing adsorption (PSA) units connected in parallel, and a controller governing the first and second PSA units and adapted to operate the first and second PSA units in alternating adsorption and desorption phases.

In a further embodiment, at least one of the separation components comprises first, second and third pressure swing adsorption (PSA) units, each one of the PSA units comprising an inlet, an outlet and a desorbed gas port, a reconfigurable valve matrix coupled to the inlet, outlet and desorbed gas port of each of the PSA units and a controller governing the reconfigurable valve matrix. In this further embodiment, the controller may be programmed to connect a pair of the PSA units in series and operate them in an adsorption mode while isolating the remaining one of the PSA units and operating it in a desorption mode, and periodically rotating the roles of the PSA units in repetitive cycles so that a different pair of the PSA units are connected in series and operated in adsorption mode while another one is operated in desorption mode each cycle. In this further embodiment, each one of the PSA units comprises a PSA vessel and a layer of an adsorbent material within the vessel, the PSA vessel comprising a chamber inlet, a desorbed species outlet port, and a chamber outlet, and a pressure swing pump coupled to the vessel.

In one embodiment, at least one of the separation components is a vacuum swing adsorption component. In another embodiment, the adsorption medium comprises one of (a) a molecular sieve, (b) a membrane.

In another aspect, a soil remediation method is provided, the method comprising extracting soil vapors from a sub-surface region of a remediation site, separating the soil vapors into plural soil vapor components, collecting a first one of the vapor components and removing it from the site, re-injecting a second one of the vapor components into the sub-surface region, and releasing into the atmosphere a third one of the vapor components. Each of the plural soil vapor components may be a purified form of the corresponding species. In one embodiment, the first vapor component comprises volatile organic compound gases, the second vapor component comprises a carbon-containing gas, and the third component comprises one of nitrogen or oxygen.

In one embodiment, the method further comprises re-injecting a fourth one of the components into the sub-surface region. In this case, the first component may comprise volatile organic compound gases, the second component may comprise a carbon-containing gas, the third component may comprise nitrogen, and the fourth component may comprise oxygen.

In one embodiment, the method further comprises injecting into the sub-surface region only some but not all of the components of the soil vapor, whereby to create a net outflow of gases from the sub-surface region. In a related embodiment, the method causes the sub-surface region to breathe in atmospheric air through soil overlying the sub-surface region by creating a net outflow of gases from the sub-surface region.

The separating into plural components comprises providing each of the components in a purified form of the component. In one embodiment, the separating comprises flowing the extracted soil vapor through a succession of separation stages, obtaining from each of the stages a corresponding one of the components, and flowing gases remaining after separation of one component in one stage to a subsequent stage for separation of a subsequent component. In this case, the separating further comprises performing pressure swing adsorption in each stage with an adsorption medium adapted to separate the corresponding component.

In one embodiment, at least one of the stages is provided as three pressure swing adsorber units, and the method includes coupling a first and second one of the pressure swing adsorber units in succession while isolating a third one of the pressure swing adsorber units, performing a separation cycle, comprising operating the first and second pressure swing adsorber units in an adsorption mode while operating the third one of the pressure swing adsorber units in a desorption mode, and recoupling the three pressure swing adsorber units by isolating the first pressure swing adsorber unit and coupling the second and third pressure swing adsorber units in succession, and operating the first pressure swing adsorber unit in the desorption mode and operating the second and third pressure swing adsorber units in the adsorption mode.

Alternatively, the performing pressure swing adsorption in at least one of the stages comprises providing the one stage as plural pressure swing adsorber units, coupling a group of the plural pressure swing adsorber units in succession and coupling an upstream one of the group of pressure swing adsorber units to receive a gas stream containing a species to be separated, performing a separation cycle, comprising operating the group of pressure swing adsorber units in an adsorption mode while operating the remaining pressure swing adsorber units in a desorption mode. The method further includes periodically rotating the roles of the pressure swing adsorber units by removing the upstream unit from the succession and replacing it in the succession with at least one of the remaining units.

The method may be performed in alternating phases comprising an aerobic phase in which the third gas is oxygen and an anaerobic phase in which the third gas is nitrogen.

BRIEF DESCRIPTION OF THE DRAWINGS

So that the manner in which the exemplary embodiments of the present invention are attained and can be understood in detail, a more particular description of the invention, briefly summarized above, may be had by reference to the embodiments thereof which are illustrated in the appended drawings. It is to be appreciated that certain well known processes are not discussed herein in order to not obscure the invention.

FIG. 5 is a table depicting the operation of a controller of the pressure swing adsorber of FIG. 4.

FIG. 6 depicts one embodiment of a pressure swing adsorber having three pressure swing adsorber components.

FIG. 7 depicts an alternative embodiment of a pressure swing adsorber having only two pressure swing adsorber components.

Figure 1:
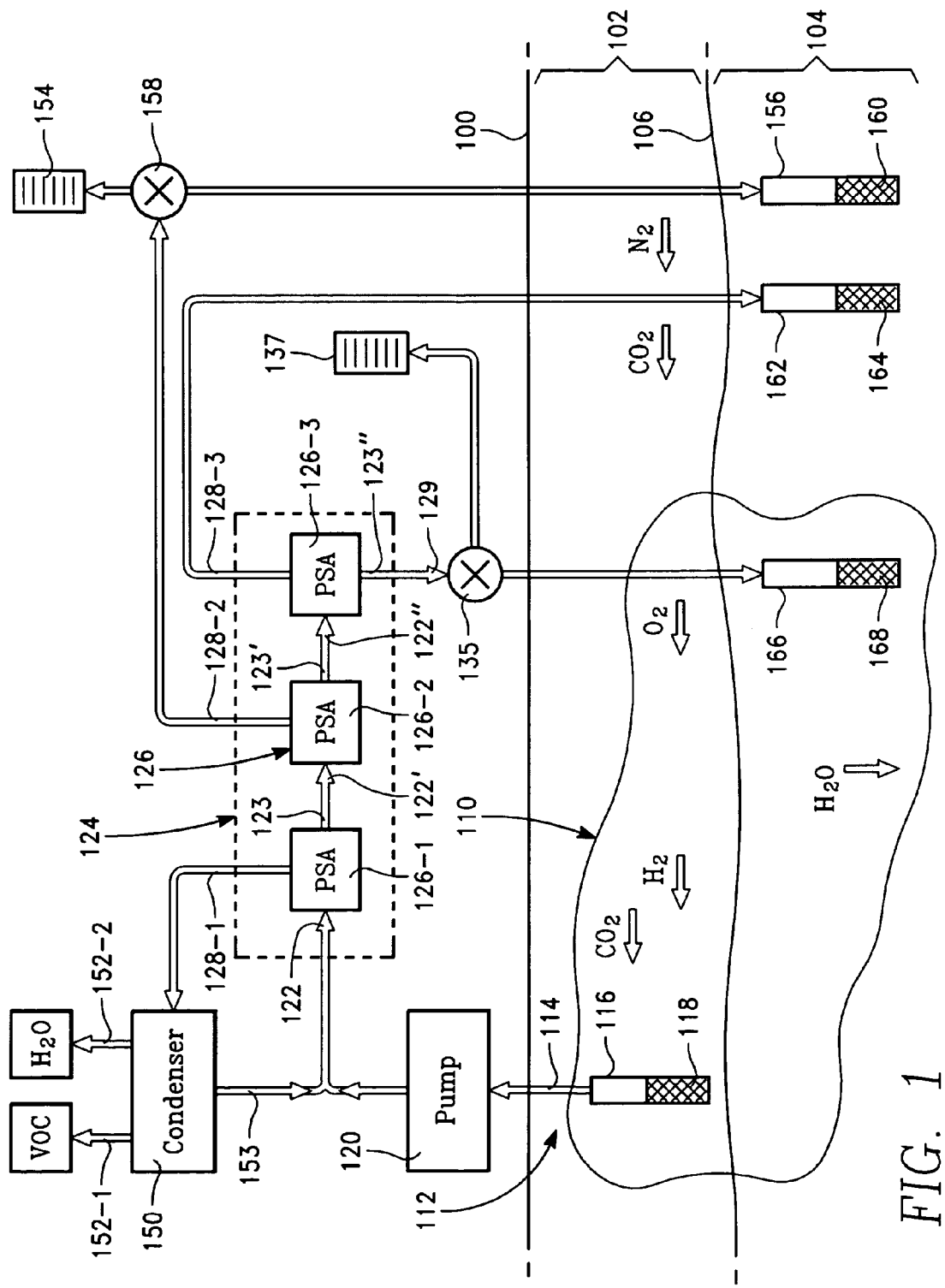
FIG. 1 is a simplified schematic diagram of a soil and ground water remediation system adapted to carry out embodiments described herein.

To facilitate understanding, identical reference numerals have been used, where possible, to designate identical elements that are common to the figures. It is contemplated that elements and features of one embodiment may be beneficially incorporated in other embodiments without further recitation. It is to be noted, however, that the appended drawings illustrate only exemplary embodiments of this invention and are therefore not to be considered limiting of its scope, for the invention may admit to other equally effective embodiments.

DETAILED DESCRIPTION

In a first embodiment, remediation of sub-surface soil and/or ground water is performed by extracting soil vapors through an extraction well extending to ground water level, and injecting gases derived from the extracted soil vapors back into the soil or ground water. This is performed without generating undesirable thermal oxidation products, without requiring thermal or chemical regeneration of an absorbing medium and while maintaining the sub-surface soil pressure below atmospheric pressure, to prevent escape of fugitive gases. In this first embodiment, the extracted soil vapors are separated into chemical components of volatile organic compound gases, water vapors, nitrogen gas, carbon dioxide gas and oxygen gas. The volatile organic compound gases may include species such as hydrocarbons, chlorinated hydrocarbons, oxygenated hydrocarbons, or the like. This separation uses a separation apparatus that requires no chemical or thermal regeneration nor replacement, and provides each separated gas or vapor in a purified form. The separation apparatus employs pressure swing adsorption in the preferred embodiment.

The term "pressure swing adsorption" (PSA) as used in this specification is intended as a generic term referring to both vacuum swing adsorption and pressure swing adsorption. Vacuum swing adsorption may be considered as a subset of the larger category of pressure swing adsorption. It differs primarily from pressure swing adsorption in that pressure swing adsorption uses a pressurized gas feed into the separation process. Vacuum swing adsorption typically draws the gas through the separation process with a vacuum. Viewed from the standpoint of absolute pressure, both species (vacuum swing adsorption and pressure swing adsorption) employ a change or swing in the absolute pressure to which the adsorption medium is subjected to achieve separation of different gas components in a purified form. This generic process is referred to herein as "pressure swing adsorption".

A preferred embodiment of the invention employs pressure swing adsorption to separate the different basic components of the extracted soil vapor from one another in successive pressure swing adsorption stages for separate disposition. The basic components of the extracted soil vapor are volatile organic compound vapors, water vapor, nitrogen, carbon dioxide and oxygen. The volatile organic compound and water vapors are separated from one another and separately condensed. The condensed volatile organic compound vapors are captured for recycling, while the condensed water vapors may be released or otherwise disposed of. The separated oxygen gas is returned and injected into the soil or ground water through one reinjection well, or may be vented to atmosphere. The separated nitrogen may be vented to atmosphere or returned and injected into soil or ground water through another reinjection well. The carbon dioxide gas is returned injected into the soil or ground water through yet another reinjection well. The different reinjection wells may be located differently for optimum soil remediation, or some of them may be combined.

The removal of the volatile organic compound vapors and the water vapor creates a net loss of gas pressure in the soil, which causes the soil to breathe in atmospheric air through its surface. This additional flow of air enhances the oxygen content of the sub-surface soil, and, together with the injection of the separated oxygen gas, greatly enhances the rate of bioremediation in the sub-surface soil and ground water. This breathing action of the soil balances the flow rates of the extracted vapors and the re-injected gases and air, and may be referred to as natural infiltration.

The foregoing embodiment requires no external gas supplies, requires no soil vapor treatment devices, such as an activated carbon bed requiring periodic replacement or regeneration, and requires no thermal treatment devices, so that no oxidation by-products are released. The only gases released to the atmosphere are purified forms of harmless gases, such as nitrogen or oxygen.

In a second embodiment, the process is performed in alternating aerobic and anaerobic bioremediation phases. In the aerobic bioremediation phase, the process is identical to the first embodiment in that the oxygen gas separated by the pressure swing adsorber is injected back into the soil. In the anaerobic bioremediation phase, the soil injection of the separated oxygen gas is halted and the separated nitrogen gas is injected into the soil instead.

Referring to FIG. 1, a remediation site has a ground level surface 100 defining a sub-surface soil layer or vadose zone 102, and an underlying ground water layer 104 having a water table level or top boundary 106. A volatile organic compound plume 110 is a region of the vadose zone 102 and of the ground water layer 104 contaminated by a volatile organic compound such as gasoline. A soil vapor extraction well 112 includes an extraction conduit 114 extending downwardly from the ground level 100, and a pipe section 116 having a screened portion 118 extending through the vadose zone. An optional pump 120 draws extracted vapor to a separator apparatus 124, which may be a pressure swing adsorber (PSA). Pressure swing adsorbers for separating out desired species are described, for example, in U.S. Pat. No. 4,857,084, and U.S. Pat. No. 6,183,628, the disclosures of which are incorporated herein by reference. The separator apparatus 124, if implemented as a PSA, may include plural adsorber components 126-1, 126-2, 126-3 adapted to pass or adsorb different chemical species. In the embodiment of FIG. 1, the individual components 126 are arranged to separately capture, from the extracted soil vapor, volatile organic compound vapors mixed with water vapor at a PSA extraction port 128-1, nitrogen gas at a PSA extraction port 128-2, carbon dioxide gas at a PSA extraction port 128-3 and oxygen gas at an gas output port 129 of the PSA apparatus 124.

In a first embodiment of the PSA apparatus 124, the PSA components 126-1, 126-2, 126-3 are of identical or similar internal structure, although each has a different adsorption medium in order to separate a different gas or vapor species. Each PSA component 126-1, 126-2, 126-3 may either employ positive pressure (to perform pressure swing adsorption) or use a vacuum (to perform vacuum swing adsorption). The PSA component 126-1 receives the extracted soil vapors from the pump 120 at its input port 122 and extracts volatile organic compound (VOC) gases and water vapors to the extraction port 128-1 while passing the remaining gases through its output port 123 to an input port 122' of the next PSA component 126-2. The PSA component 126-2 extracts the nitrogen gases to the extraction port 128-2 while passing the remaining gases through its output port 123' to the input port 122" of the next PSA component 126-3. The PSA component 126-3 extracts the carbon dioxide gases to the extraction port 128-3 while passing the remaining gas, i.e., oxygen, to its output port 123", which is connected to the output port 129 of the PSA apparatus 124.

A condenser 150 receives the mixture of VOC and water vapors from the PSA output port 128-1 and separates the volatile organic compound and water vapors by exploiting their different condensation temperatures. The condenser 150 provides the condensed volatile organic compound(s) (VOC's), in liquid form, at a first output 152-1 and provides the condensed water at a second output 152-2. Uncondensed gases from the condenser 150 may be returned to the separator 124 through a return path 153. The volatile organic compound liquid and water are collected separately, the volatile organic compound to be recycled off-site (for example) and the water to be dispersed. The pressure swing adsorption process performed by the PSA component 126-1 separates each of the target species (i.e., the water and the VOC matter) into a purified form. For example, the separated water at the output 152-2 contains less than 1-10 parts per million of volatile organic compounds in the water, so that the water to be dispersed is in a purified form. This level of purity of the separated target species is typical of each of the PSA components 126-1, 126-2 and 126-3.

The nitrogen gas from the PSA output port 128-2 is either output to a disperser 154, for atmospheric release or for capture and recycling, or is returned to the ground through an injection (sparging) well 156. A valve 158 may be provided to direct the nitrogen gas to either the disperser 154 or the sparging well 156. The sparging well 156 may have a screened disperser section 160 which may be submerged below the ground water level 106. Optionally the nitrogen gas from the PSA output port 128-2 may be diverted back to the PSA components 126-1, 126-2 or 126-3 in the reverse flow direction as a purge gas during the desorption operating phase of each PSA component, as will be described below with reference to FIG. 4A.

The carbon dioxide gas from the PSA output port 128-3 is output to a sparging well 162. The sparging well 162 may have a screened disperser section 164 which may be submerged below the ground water level 106.

The oxygen gas from the PSA output port 129 is output to a sparging well 166. The sparging well 166 may have a screened disperser section 168 which may be submerged below the ground water level 106. The sparging well 166 may be located within the volatile organic compound plume 110. Optionally, any or all of the sparging wells 156, 162, 166 may be located within the volatile organic compound plume 110. In one embodiment discussed below, it may be desirable to periodically stop oxygen flow to the oxygen sparging well 166. This feature may be enabled by provision of an optional valve 135 capable of directing the separated oxygen gas flow to either the sparging well 166 or to a disperser 137 (which may be used to collect the oxygen or to disperse it to atmosphere).

In the embodiment of FIG. 1, no gas or vapor is injected into the soil that is not derived from extracted soil vapors. Therefore, there is no net inflow into the ground and therefore no positive ground pressure that could result in escape of fugitive gases to the atmosphere through the ground surface. The removal of the volatile organic compound vapors and the water vapor produces a net mass flow out from the soil, which creates a soil pressure below atmospheric pressure, causing the soil to aspirate (breathe in) air. This air flow enhances the oxygen content of the soil, and together with the separated oxygen gas injected through the sparging well 166, greatly enhances the rate of aerobic bioremediation in the sub-surface soil and ground water within the volatile organic compound plume 110. The process is one of recycling rather than waste creation, and therefore fits the definition of a completely "green" soil remediation process without the regeneration cost burden of a conventional carbon treatment process, nor the undesirable by-products of a thermal treatment process.

Figure 2:
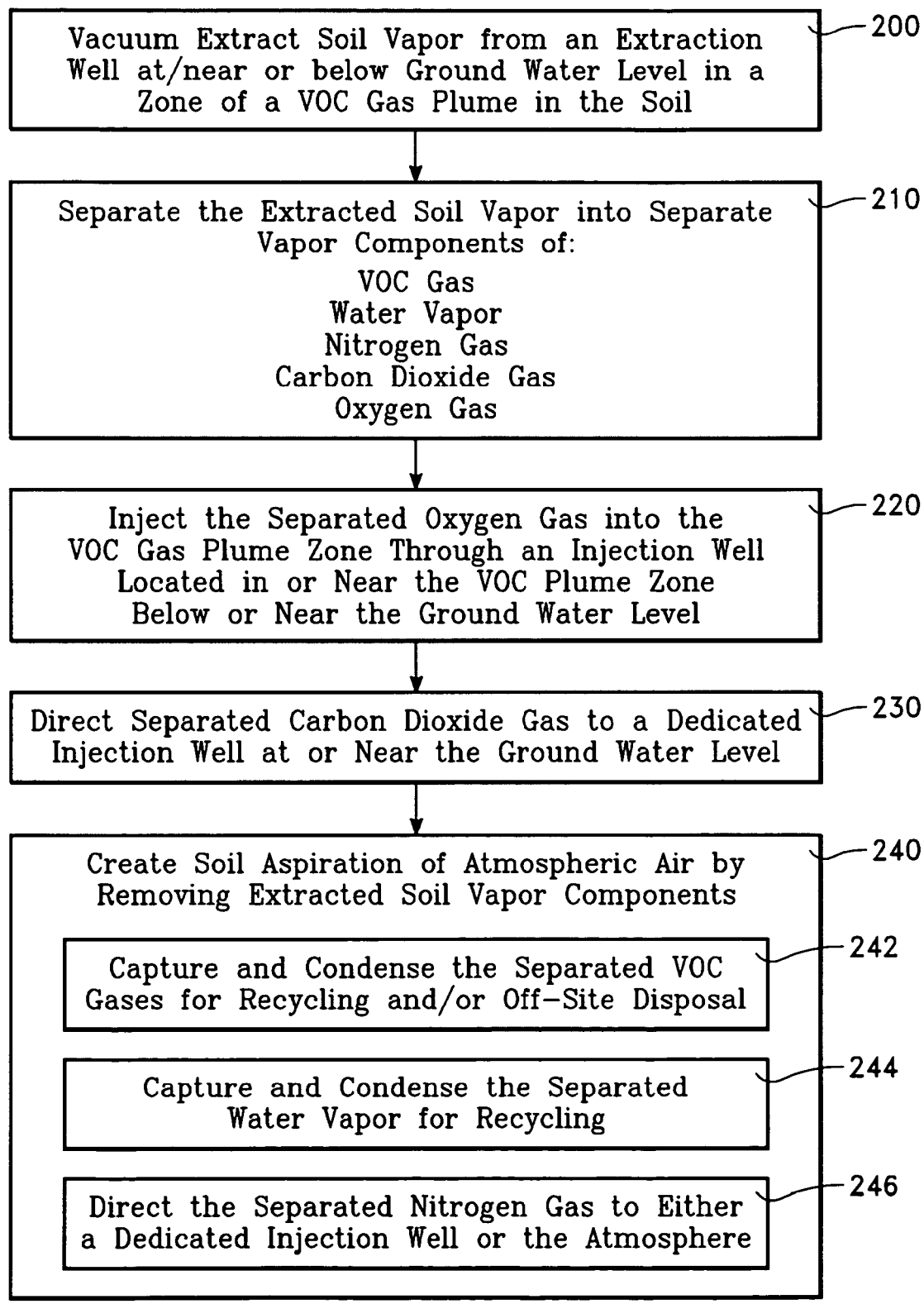
FIG. 2 is a block flow diagram of a process in accordance with a first embodiment.

FIG. 2 depicts a process in accordance with a first embodiment that can be performed by the remediation system of FIG. 1. The process proceeds as follows: vacuum extract soil vapor from an extraction well at or near ground water level in a zone of a volatile organic compound plume in the soil (block 200 of FIG. 2); separate the extracted soil vapor into separate vapor components of volatile organic compound gases, water vapor, nitrogen gas, carbon dioxide gas and oxygen gas (block 210); inject the separated oxygen gas into the volatile organic compound plume zone through an injection well located in or near the zone of the volatile organic compound plume zone below or near ground water level (block 220); direct the separated carbon dioxide gas to a dedicated injection well at or near ground water level (block 230); create soil aspiration of atmospheric air by removing certain extracted soil vapor components (block 240). Block 240 is carried out as follows: capture and condense the separated volatile organic compound gases for recycling/off-site disposal (block 242); capture and condense the separated water vapor for recycling (block 244); and direct the separated nitrogen gas to either a dedicated injection well or into the atmosphere (block 246).

Figure 3:
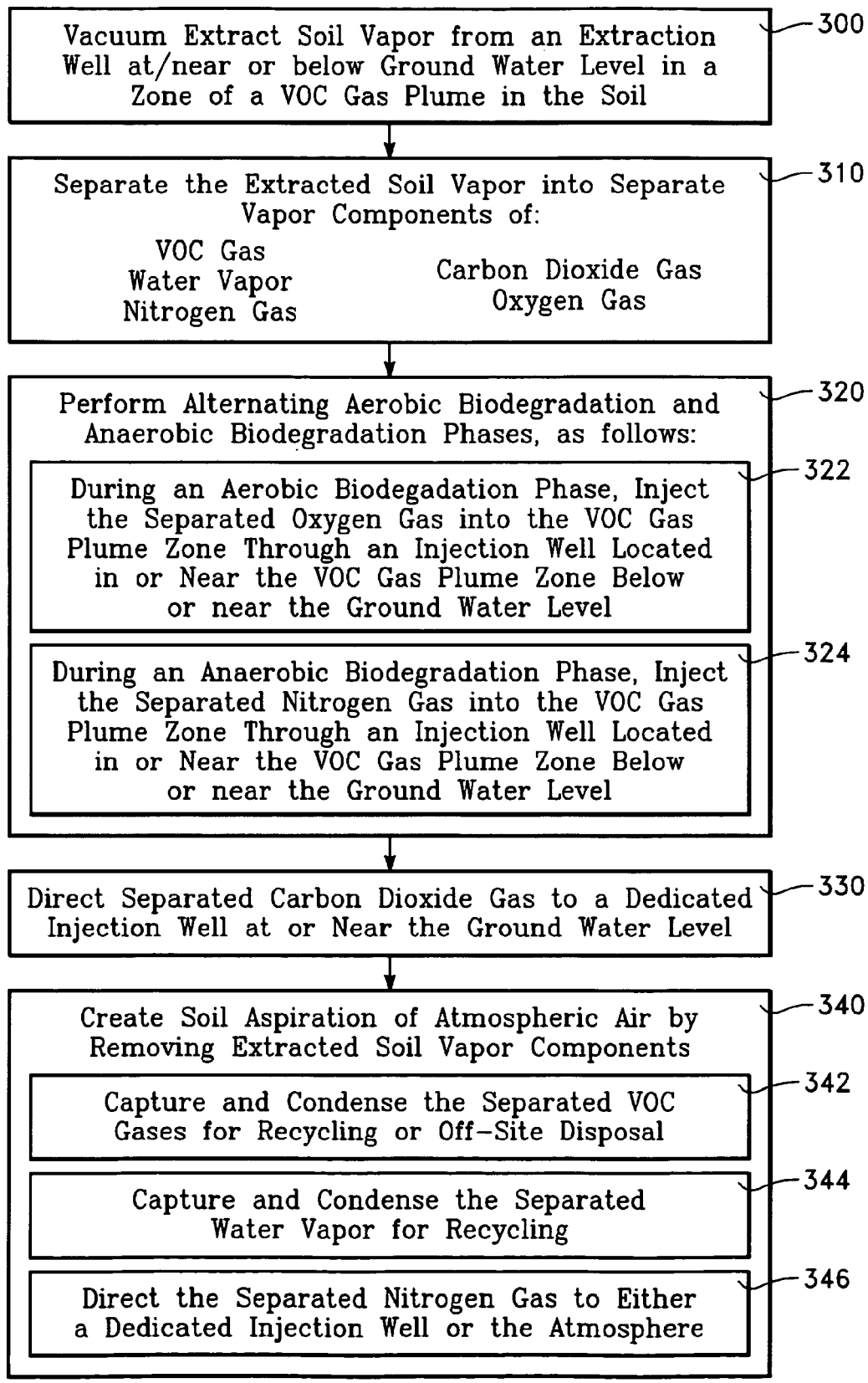
FIG. 3 is a block flow diagram of a process in accordance with a second embodiment.

FIG. 3 depicts a process in accordance with a second embodiment that can be performed by the remediation system of FIG. 1. The process proceeds as follows: vacuum extract soil vapor from an extraction well at or near ground water level in a zone of a volatile organic compound plume in the soil (block 300 of FIG. 3); separate the extracted soil vapor into separate vapor components of volatile organic compound gases, water vapor, nitrogen gas, carbon dioxide gas and oxygen gas (block 310); perform alternating aerobic biodegradation and anaerobic biodegradation phases (block 320). Block 320 is carried out as follows: during an aerobic biodegradation phase, inject the separated oxygen gas into the volatile organic compound plume zone through an injection well located in or near the zone of the volatile organic compound plume zone below or near ground water level (block 322); and, during an anaerobic biodegradation phase, inject the separated nitrogen gas into the volatile organic compound plume zone through an injection well located in or near the zone of the volatile organic compound plume zone below or near ground water level (block 324). The process of FIG. 3 continues as follows: direct the separated carbon dioxide gas to a dedicated injection well at or near ground water level (block 330); create soil aspiration of atmospheric air by removing certain extracted soil vapor components (block 340). Block 340 is carried out as follows: capture and condense the separated volatile organic compound gases for recycling/off-site disposal (block 342); capture and condense the separated water vapor for recycling (block 344); and, direct the separated nitrogen gas during the aerobic phase or oxygen gas during the anaerobic phase to either a dedicated injection well or into the atmosphere (block 346).

In order to implement the alternating aerobic and anaerobic phases of the process of FIG. 3, the oxygen valve 135 and the nitrogen valve 158 are operated in alternating sequence so that during one phase oxygen is injected into the ground and during the other phase nitrogen is injected into the ground.

The alternating aerobic and anaerobic phases of the embodiment of FIG. 3 may be useful for remediation of substances, such as some chlorinated solvents, that change during remediation from one that biodegrades best with oxygen and one that biodegrades best without oxygen (or vice versa). If the contaminant is MBTE (Methyl Tertiary-Butyl Ether), it is best degraded to TBA (Tertiary Butyl Alcohol) in situ without oxygen. During this phase, it is believed the MBTE is biodegraded by a microorganism that thrives best without oxygen. This corresponds to an anaerobic degradation phase. Once this transformation is complete, the contamination is entirely TBA, which best degrades in presence of oxygen, using microorganisms that thrive in the presence of oxygen. Therefore, a second phase is performed in which oxygen is injected into the soil with little or no injection of nitrogen. Other contaminants may require the aerobic and anaerobic phases to be performed in an order different from that described above.

In other embodiments, not all of the gases discussed above are separated from one another. For example, the separator 124 separates the volatile organic compounds and water vapor from the other three main gases (nitrogen, carbon dioxide and oxygen) and may leave at least two of the other three gases (nitrogen, carbon dioxide, oxygen) mixed together for injection back into the soil or release elsewhere. For example, the carbon dioxide may be separated and injected into the soil, while the nitrogen and oxygen may be left unseparated for atmospheric release or returning to the soil, for example.

Figure 4A:
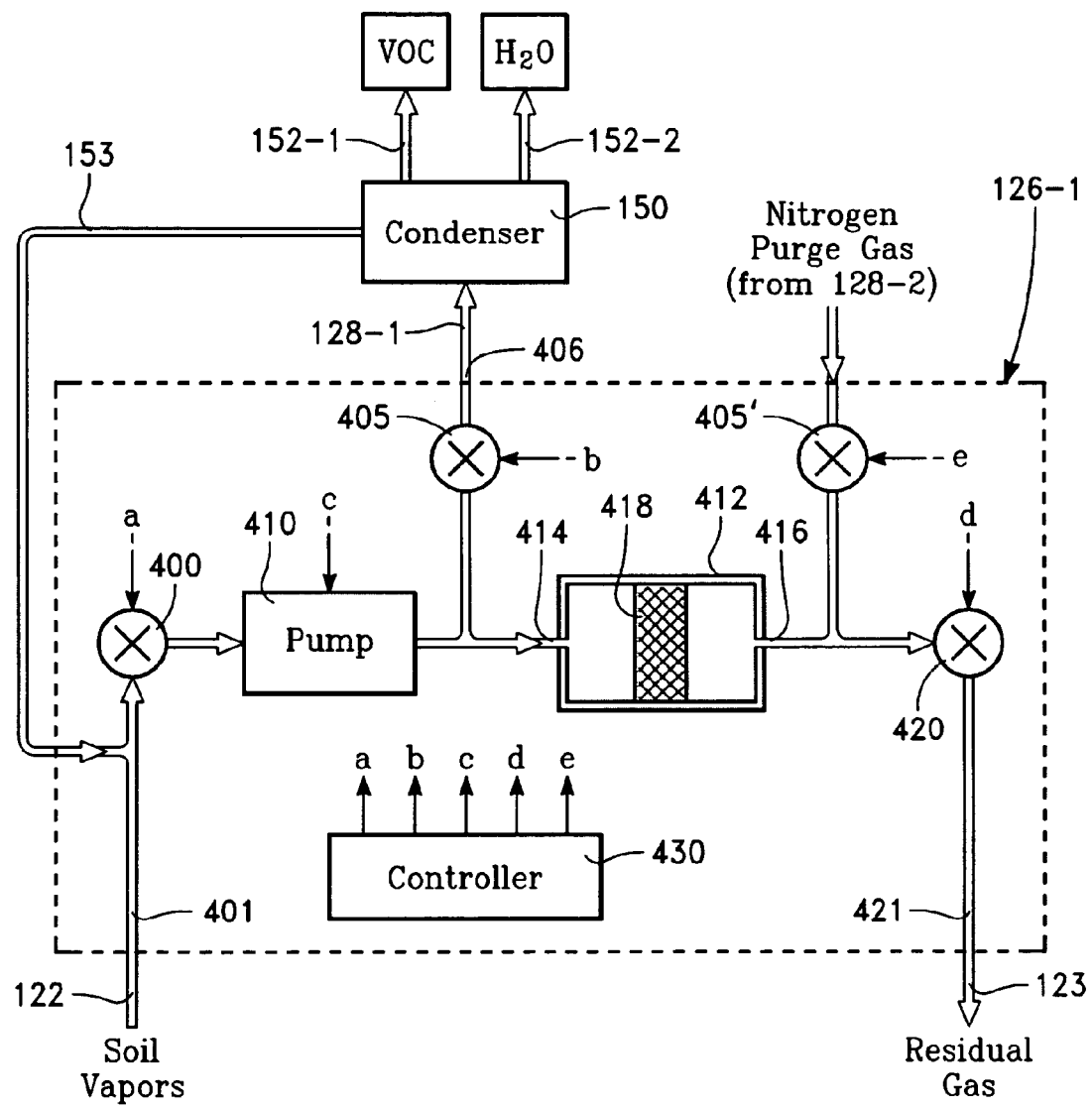
FIG. 4A is a diagram depicting in detail a portion of the system of FIG. 1 including a pressure swing adsorber.

FIG. 4A depicts a portion of the system of FIG. 1 including the PSA component 126-1 and the condenser 150 in greater detail, revealing the internal structure of the PSA component 126-1 which is similar or identical to the internal structures of the other PSA components 126-2, 126-3. The PSA component 126-1 includes an inlet valve 400 for admitting extracted soil vapors from a conduit 401 connected to the inlet 122, an outlet valve 405 for admitting desorbed volatile organic compound and water vapors through a desorption conduit 406 to the extraction outlet 128-1. The PSA component 126-1 further includes a pump 410 having an inlet connected to the valve 400. A PSA vessel 412 has an inlet 414 connected to the pump 410 and to the outlet valve 405, an outlet 416 and an adsorbent material 418 between the inlet 414 and outlet 416. The pump 410 in the illustrated embodiment provides positive pressure to the vessel inlet and therefore the PSA component performs pressure swing adsorption rather than vacuum swing adsorption.

Continuing the description of the PSA component 126-1, an outlet valve 420 controls gas flow of residual (non-adsorbed) gases from the PSA vessel outlet 416 to a residual gas outlet 421 that is connected to the outlet 123. A controller 430 provides control signals a, b, c and d, respectively, to the valve 400, the valve 405, the pump 410 and the valve 420. The signals a, b and d are independent valve-open and valve-close commands, while the signal c determines the pressure the pump 410 applies to the vessel inlet 414, to perform the required pressure swing. In the high pressure state, the pump 410 forces extracted soil vapors into the vessel 412, so that a target species contained in the vapors is adsorbed onto the adsorbent material 418. The adsorbent material 418 is chosen for its ability to trap the target species (e.g., volatile organic compound and water molecules) while under high pressure from the pump 410.

Typically, the adsorbent material is characterized by a pore size corresponding to the particle or molecule size or diameter of the target species. The species not adsorbed on the adsorbent material 418 (e.g., oxygen, nitrogen and carbon dioxide) flow to the vessel outlet 416. After the adsorbent material 418 has trapped a desired amount of target species (e.g., volatile organic compound and water molecules in the case of the PSA component 126-1), or after a predetermined amount of time, the pump pressure is reduced so that the adsorbed materials are desorbed or drawn out of the adsorbent material 418 in the reverse direction (through the inlet 414). During the adsorption phase, the valves 400, 405 and 420 are configured so that gas flows from the pump 410 and through the vessel 412 to the outlet 416. During the desorption phase, the valves 400 and 420 are closed while the valve 405 is opened, so that desorbed gas flows from the adsorber material 418 through the inlet 414 and out through the valve 405 and desorption outlet 406. Optionally, a purge gas such as nitrogen gas from the desorbed gas outlet 128-2 of the PSA component 126-2 (FIG. 1) flows in the reverse direction to the outlet 416 under control of a valve 405' near the conclusion of the desorption phase of operation. The controller 430 may control the valve 405' through a control signal "e". The valve 405' is opened and closed with the valve 405, although some delay may exist between the opening and closing times of the two valves. The valve 405' responds to the control signal, e, from the controller 430. The process is repeated cyclically.

Figure 4B:
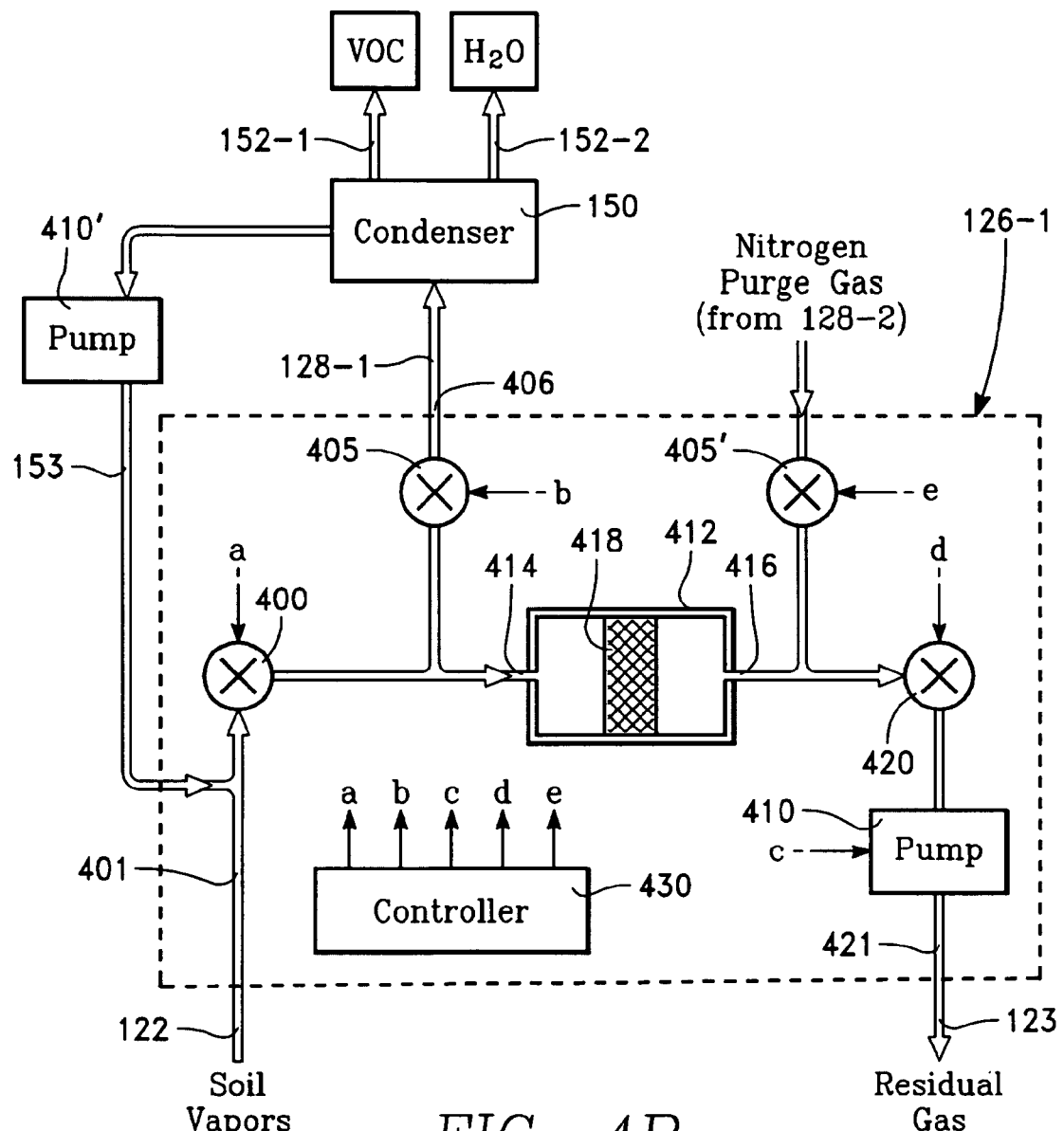
FIG. 4B is a diagram depicting in detail a portion of the system of FIG. 1 implemented as a vacuum swing adsorber.

In an alternative embodiment depicted in FIG. 4B, the PSA component 126-1 performs vacuum swing adsorption. In this case, the pump 410 is located at the residual gas outlet 421 to apply a vacuum for drawing gases into the vessel 412 through the inlet 414 during the adsorption phase of operation. During the desorption phase of operation, the valves 400 and 420 are closed, the valve 405 is opened, and a pump 410' at the recirculation conduit 153 draws desorbed gases out from the vessel 412 back through the inlet 414 and to the condenser 150. A purge gas such as nitrogen gas from the desorbed gas outlet 128-2 of the PSA component 126-2 (FIG. 1) flows in the reverse direction to the outlet 416 under control of a valve 405' near the conclusion of the desorption phase of operation. The valve 405' is opened and closed with the valve 405, although some delay may exist between the opening and closing times of the two valves. The valve 405' responds to the control signal, e, from the controller 430. Location of the pump 410' at the recirculation conduit 153 rather than at the outlet 406 is preferred, since this preferred location guarantees that nearly all the VOC gases and water will have been removed from gases that reach the pump 410'.

Figure 4C:
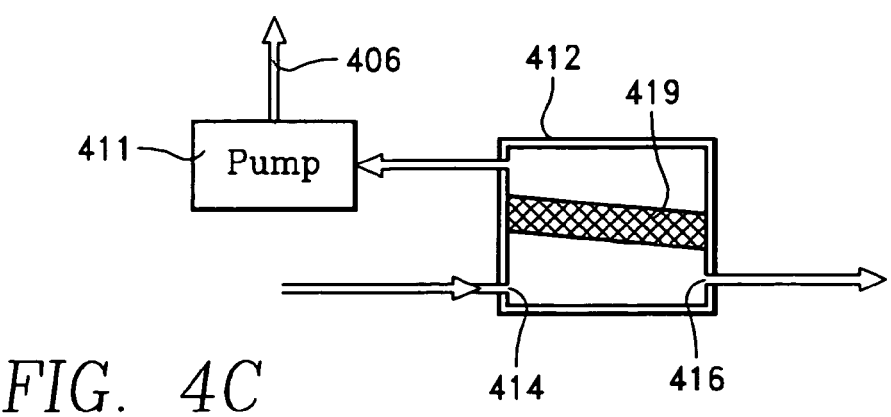
FIG. 4C depicts an alternative embodiment employing an adsorbing membrane.

FIG. 4C depicts an alternative embodiment in which the adsorbent material or layer 418 of FIG. 4A extending across the vessel 412 is replaced by an adsorbing membrane 419 extending diagonally across the vessel 412. Non-adsorbed gases flow to the outlet 416, while species adsorbed in the membrane 419 are drawn through the membrane (desorbed) and out to the desorption outlet 406 by a second pump 411.

FIG. 5 depicts a table of the control signals a, b, c and d and the corresponding states of the valves and pump in the adsorption and desorption phases of the PSA component of FIG. 4A. In the adsorption phase, the valves 400 and 420 are open, the valve 405 is closed and the pump 410 is at a higher pressure setting. In the desorption phase, the valves 400 and 420 are closed, the pump 410 is at a lower pressure setting (or zero pressure setting) and the valve 405 is open. As one example, if the adsorbent 418 is an activated carbon sieve, then the higher pump pressure may be about 7 psi absolute and the lower pump pressure may be less than 1 psi absolute. As another example, if the absorbent material 418 is a zeolite sieve, then the higher pressure may be about 85 psi absolute and the lower pressure may about 20 psi absolute.

FIG. 6 depicts one embodiment of the PSA apparatus 124 consisting of the three PSA components 126-1, 126-2 and 126-3. The internal structure of each one of the three PSA components 126-1, 126-2, 126-3 is not depicted in FIG. 6 but may be identical or similar to the internal structure of the PSA component 126-1 depicted in FIG. 4A, although the adsorbent material (418 in FIG. 4A) may differ. In the embodiment of FIG. 6, the PSA component 126-1 has as its absorbent material a 20 Å activated carbon sieve, which efficiently adsorbs volatile organic compound gases and water vapor above a threshold pressure. The PSA component 126-2 has as its adsorbent material a 4 Å carbon molecular sieve, which efficiently adsorbs nitrogen gas above a threshold pressure. The PSA component 126-3 has as its adsorbent material a 13 Å zeolite sieve, which efficiently adsorbs carbon dioxide gas above a threshold pressure. The first PSA component 126-1 removes volatile organic compound and water vapors from the downstream gas flow, the second PSA component 126-2 removes nitrogen gas from the downstream gas flow, and the third PSC component 126-3 removes carbon dioxide from the downstream gas flow, leaving oxygen as the residual gas. The removal (desorption) in each PSA component 126-1, 126-2, 126-3 is performed by reducing the pressure at the PSA vessel inlet, as described above with reference to, FIG. 4A.

Each PSA component 126-1, 126-2, 126-3 is designed to trap (adsorb) a different target species (e.g., volatile organic compound gas, nitrogen, carbon dioxide, respectively), which it outputs at its desorption outlet (406 of FIG. 4A) in a very pure form, typically containing less than between 1 and 10 parts per million of impurities (species other than the target species). Thus, in the system of FIG. 1, the volatile organic compound gases provided to the condenser, the nitrogen gas released to the atmosphere, the oxygen gas returned to the volatile organic compound plume and the carbon dioxide gas returned through a sparging well are all very close to being pure, with virtually no other species present.

FIG. 7 depicts another embodiment employing only two PSA components 126-1, 126-2. The first PSA component 126-1 has an adsorbent material suitable for separating out volatile organic compound and water vapors, so that its residual gases passed on to the second PSA component 126-2 are nitrogen, oxygen and carbon dioxide. The second PSA component 126-2 of FIG. 7 has an adsorbent material suitable for separating out carbon dioxide from the oxygen and nitrogen gases. The residual gases passed on by the second PSA component are nitrogen and oxygen, and these may be left as a mixture rather than being separated, and either returned to the soil via a sparging well or released to the atmosphere.

Figure 8:
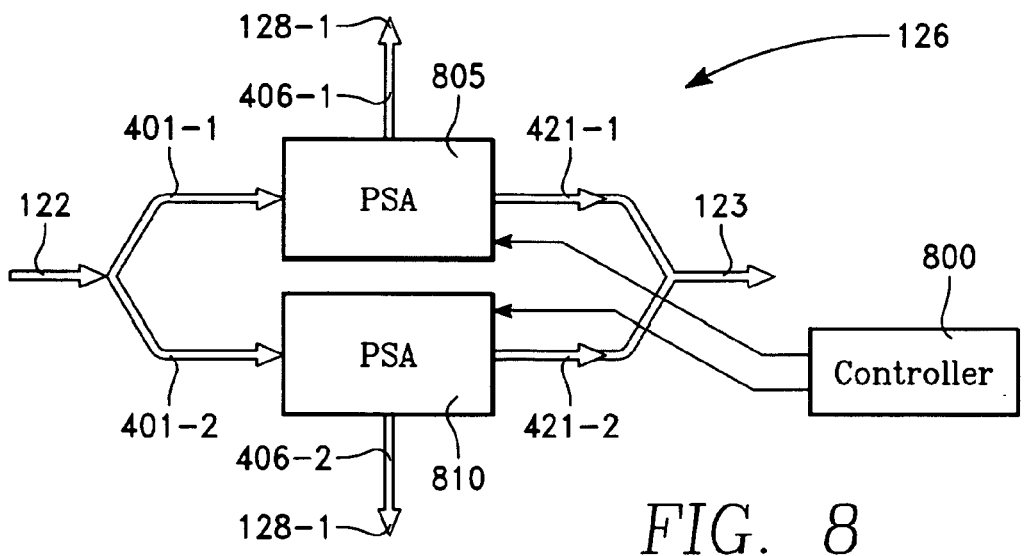
FIG. 8 depicts one embodiment of a single pressure swing adsorber component having a pair of pressure swing adsorber units connected in parallel for tandem operation in alternating adsorption and desorption cycles.

FIG. 8 depicts an embodiment of an individual one of the PSA components 126 (for example, the PSA component 126-1) that may be typical of each of the PSA components of the PSA apparatus 124, in which the individual PSA component 126 consists of a pair of complete PSA units 805, 810 operating in tandem. Each individual PSA unit 805, 810 is identical or similar in structure to the PSA component 126-1 of FIG. 4A and may be operated in the manner described above with reference to FIG. 4A. Specifically, the first PSA unit 805 has an inlet 401-1, a desorption outlet 406-1 and a residual gas outlet 421-1 corresponding to the inlet 401, the outlet 406 and the outlet 421, respectively, of FIG. 4A. Similarly, the second PSA unit 810 has an inlet 401-2, a desorption outlet 406-2 and a residual gas outlet 421-2 corresponding to the inlet 401, the outlet 406 and the outlet 421, respectively, of FIG. 4A. The PSA unit inlets 401-1, 401-2 are connected to the inlet 122 of the PSA component 126, while the PSA unit outlets 421-1, 421-2 are connected to the outlet 123 of the PSA component 126. A single controller 800 controls both PSA units 805 and 810 in the manner described above, except that the controller 800 operates one PSA unit (805 or 810) in the adsorption phase while operating the other PSA unit in the desorption phase, and then reverses their roles. This process is repeated.

Figure 9A:
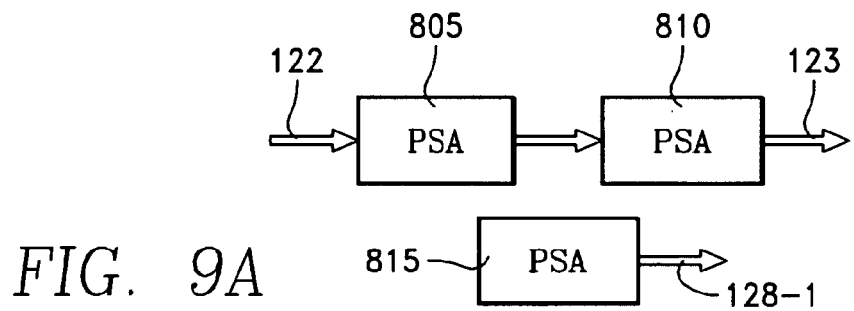
FIGS. 9A, 9B and 9C depict a sequence of configurations of three pressure swing adsorber units using a rapidly reconfigurable valve controller.
Figure 9B:
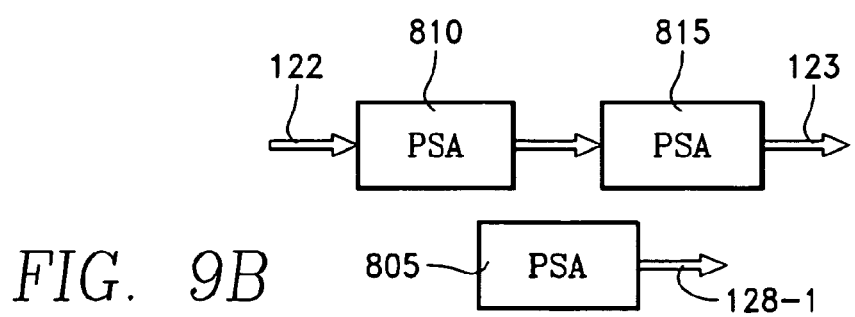
Figure 9C:
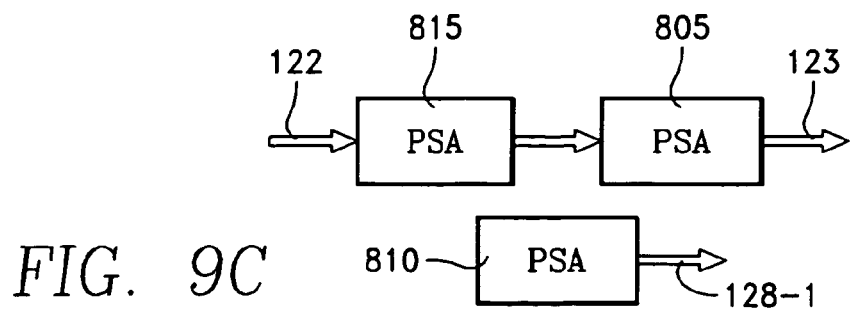

FIGS. 9A, 9B and 9C depict a sequence of different configurations of three PSA units 805, 810, 815 of the same internal structure. In the sequence of FIGS. 9A, 9B and 9C, two of the three PSA units are connected in series to provide additional separation of residual gases in adsorption mode, while the third PSA unit operates in desorption mode. After the leading PSA unit is nearly saturated in adsorption mode, it is isolated from the others and operated in desorption mode, while the other two PSA units are connected in series and operated in adsorption mode. In FIG. 9A, the PSA unit 805 is the lead (upstream) unit and is connected in series with the PSA unit 810, and both are operated in adsorption mode. The residual (non-adsorbed) gases from the PSA unit 805 are subjected to a further adsorption process in the PSA unit 810 for enhanced separation. The third PSA unit 815 is isolated from the PSA units 805, 810 and operates in the desorption mode, in which no gases are received but adsorbed species are drawn out. In the next phase (FIG. 9B), the arrangement has been reconfigured (recoupled). The first PSA unit 805 has adsorbed a large quantity of the target species, and is now isolated from the other two units 810, 815, and is operated in the desorption mode. The other two units 810, 815 are connected in series and operated in the adsorption mode, with the second PSA unit 810 now being the lead (upstream) unit. Once the second PSA unit 810 has adsorbed a large amount of the target species, the arrangement is again reconfigured (FIG. 9C) to begin the next phase. In FIG. 9C, the PSA unit 810 is isolated from the other units (805, 815) and operated in desorption mode, while the PSA units 815 and 805 are connected in series and operated in the adsorption mode. The cycle then returns to the configuration of FIG. 9A and repeats.

Figure 10:
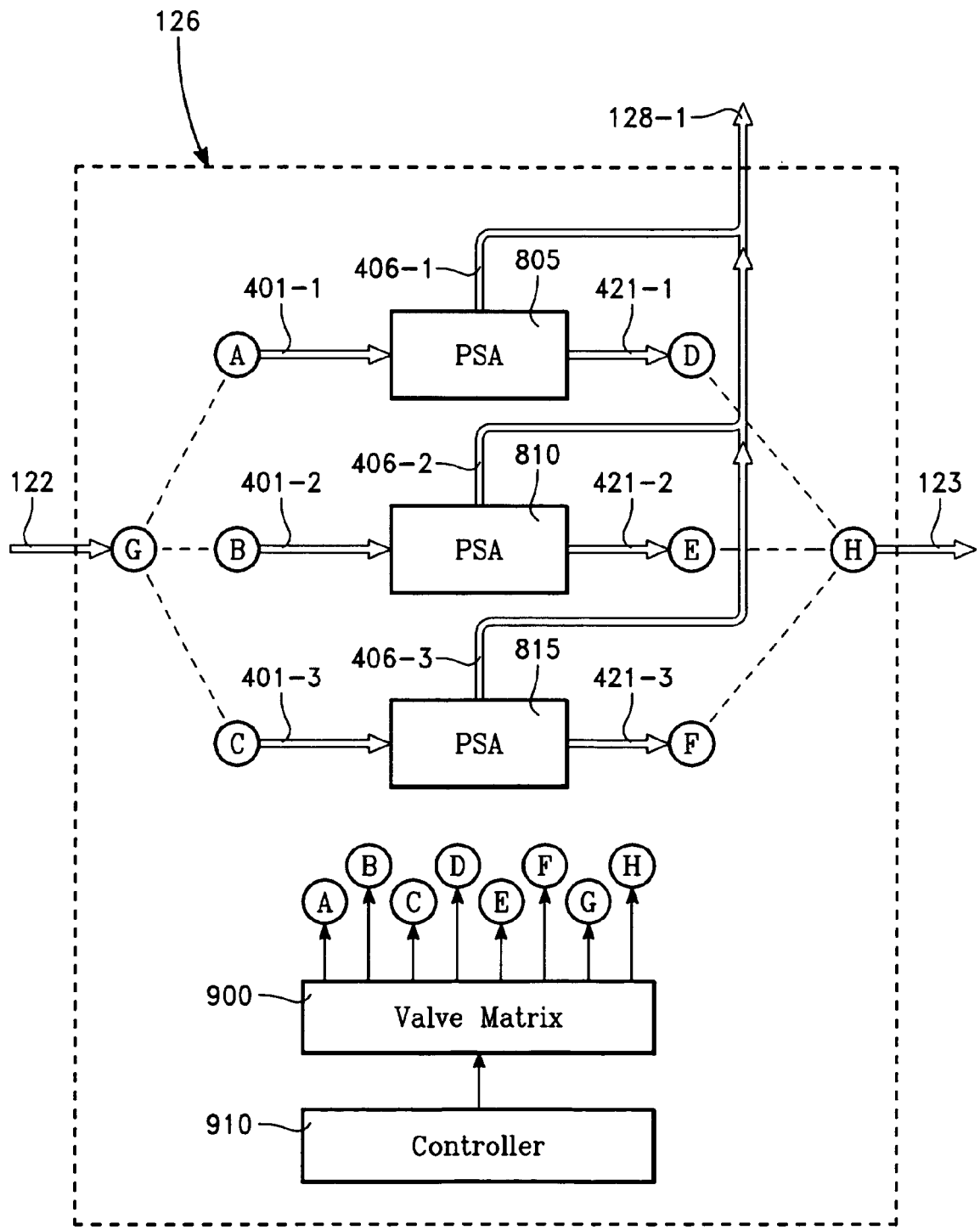
FIG. 10 depicts a system for realizing the sequence of PSA configurations of FIGS. 9A through 9C, including a configuration matrix and a controller.

FIG. 10 depicts a single PSA component 126 that includes the three PSA units 805, 810, 815 in a reconfigurable arrangement for realizing the sequence of FIGS. 9A through 9C. The first PSA unit 805 has an inlet 401-1, a desorption outlet 406-1 and a residual gas outlet 421-1 corresponding to the inlet 401, the outlet 406 and the outlet 421, respectively, of FIG. 4A. Similarly, the second PSA unit 810 has an inlet 401-2, a desorption outlet 406-2 and a residual gas outlet 421-2 corresponding to the inlet 401, the outlet 406 and the outlet 421, respectively, of FIG. 4A. Likewise, the third PSA unit 815 has an inlet 401-3, a desorption outlet 406-3 and a residual gas outlet 421-3 corresponding to the inlet 401, the outlet 406 and the outlet 421, respectively, of FIG. 4A.

The PSA unit 805 is provided with an input port A at the inlet 401-1, and an output port D at the outlet 421-1, the PSA unit 810 is provided with an input port B at the inlet 401-2 and an output port E at the outlet 421-2, and the PSA unit 815 is provided with an input port C at the inlet 401-3 and an output port F at the inlet 421-3. There is an upstream PSA port G connected to the inlet 122 of the PSA component 126 and a downstream PSA port H connected to the outlet 123 of the PSA component. The ports A through H are not connected to one another except through a configurable matrix valve array 900. The configurable matrix valve array 900 is connected to each individual port A through H, and provides all required combinations of connections among the ports A through H. A controller 910 controls the valve matrix array 900 in a manner required to realize the reconfiguration sequence of FIGS. 9A through 9C. One example of the configurable matrix valve array 900 is depicted in FIG. 11.

Figure 11:
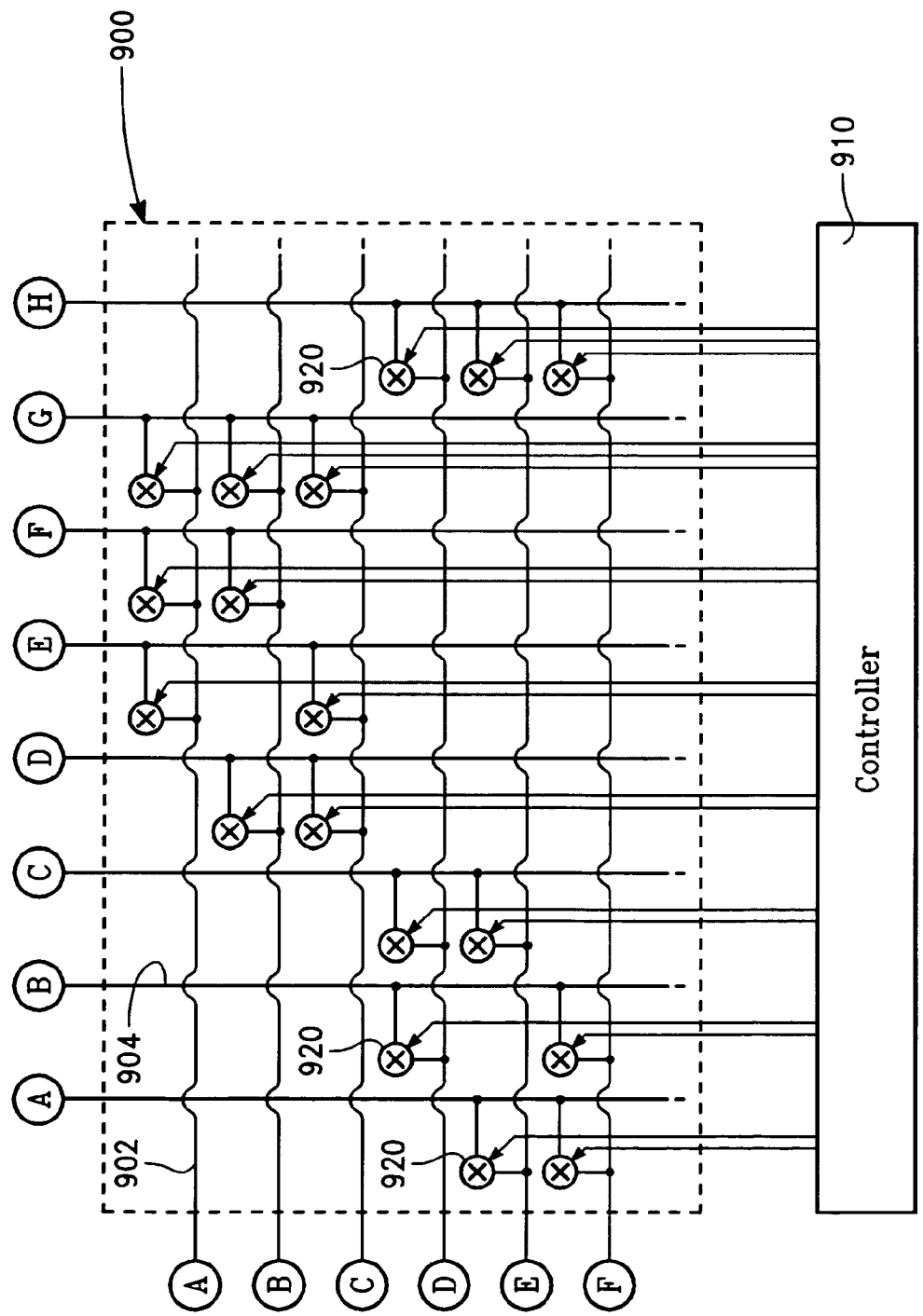
FIG. 11 depicts one example of the configuration matrix of FIG. 10.

Referring to FIG. 11, the valve matrix 900 may be implemented as a cross-over array of non-intersecting row conduits 902 and column conduits 904, each one connected to a particular one of the ports A through H. Connections between different ports are provided by individual valves 920 where corresponding row and column conduits 902, 904 overlay. The controller 910 controls the opening and closing of each valve 920 individually. The controller 910 may be programmed in accordance with conventional techniques to repeatedly reconfigure the connections among the three PSA units 805, 810, 815 in accordance with the sequence described above with reference to FIGS. 9A, 9b and 9C.

While the foregoing is directed to embodiments of the present invention, other and further embodiments of the invention may be devised without departing from the basic scope thereof, and the scope thereof is determined by the claims that follow.

What is claimed is:

1. A soil remediation system, comprising:
   an in-ground extraction well;
   a separation apparatus connected to receive extracted soil vapors from said extraction well and comprising plural separation components, respective ones of said plural separation components adapted to separate a respective species contained in said extracted soil vapors, said plural separation components being connected in a succession to provide respective separated species flow streams of said respective species from the respective separation components;
   a condenser coupled to receive the separated species flow stream of a first species from a first one of said separation components; and
   a first dispersion apparatus comprising one of (a) an in-ground injection well or (b) an atmospheric vent, said first dispersion apparatus coupled to receive a species flow stream of a second species from a second one of said separation components.

2. The system of claim 1 wherein:
   said first species comprises water vapor and volatile organic compound gases; and
   said condenser comprises a volatile organic compound gas outlet and a separate water outlet.

3. The system of claim 2 wherein said condenser is adapted to separate volatile organic compound gases and water vapor.

4. The system of claim 2 wherein said second species comprises one of nitrogen, carbon dioxide or oxygen.

5. The system of claim 4 wherein said second separation component is adapted to separate said second species to a respective separated species flow stream.

6. The system of claim 4 further comprising:
   a second dispersion apparatus comprising one of (a) an in-ground injection well or (b) an atmosphere vent, said second dispersion apparatus coupled to receive the separated species flow stream of a third species from a third one of said separation components; and
   wherein said third species comprises another one of nitrogen, carbon dioxide or oxygen.

7. The system of claim 6 wherein said third separation component is adapted to separate said third species to a respective separated species flow stream.

8. The system of claim 7 further comprising:
   a third dispersion apparatus comprising one of (a) an in-ground injection well or (b) an atmosphere vent, said further dispersion apparatus coupled to receive a residual gas flow stream of a fourth species from said third one of said separation components; and
   wherein said fourth species comprises the remaining one of nitrogen, carbon dioxide or oxygen.

9. The system of claim 8 wherein said second species is nitrogen, said third species is carbon dioxide and said fourth species is oxygen.

10. The system of claim 1 further comprising a pump coupled between said extraction well and said first separation component.

11. The system of claim 1 further comprising:
    a second dispersion apparatus comprising one of (a) an in-ground injection well or (b) an atmosphere vent, said second dispersion apparatus coupled to receive a residual gas flow stream of a third and fourth species from said second one of said separation components;
    wherein said first species comprises volatile organic compound gases and water vapor, said second species comprises carbon dioxide and said third and fourth species comprise nitrogen and oxygen.

12. The system of claim 1 wherein each one of said separation components comprises a pressure swing adsorption component comprising a vessel and a respective adsorption medium in the vessel adapted to adsorb the respective species, and a pump coupled to said vessel and operable in successive adsorption and desorption phases.

13. The system of claim 1 wherein at least one of said separation components comprises first and second pressure swing adsorption (PSA) units connected in parallel, and a controller governing said first and second PSA units and adapted to operate said first and second PSA units in alternating adsorption and desorption phases.

14. The system of claim 1 wherein at least one of said separation components comprises:
    first, second and third pressure swing adsorption (PSA) units, each one of said PSA units comprising an inlet, an outlet and a desorbed gas port;
    a reconfigurable valve matrix coupled to the inlet, outlet and desorbed gas port of each of said PSA units; and
    a controller governing said reconfigurable valve matrix.

15. The system of claim 14 wherein said controller is programmed to connect a pair of said PSA units in series and operate them in an adsorption mode while isolating the remaining one of said PSA units and operating it in a desorption mode, and periodically rotating the roles of said PSA units in repetitive cycles so that a different pair of said PSA units are connect in series and operated in adsorption mode while another one is operated in desorption mode each cycle.

16. The system of claim 15 wherein each one of said PSA units comprises:
    a PSA vessel and a layer of an adsorbent material within said vessel, said PSA vessel comprising a chamber inlet, a desorbed species outlet port, and a chamber outlet; and
    a pressure swing pump coupled to said vessel.

17. The system of claim 12 wherein at least one of said separation components is a vacuum swing adsorption component.

18. The system of claim 12 wherein said adsorption medium comprises one of (a) a molecular sieve, (b) a membrane.

19. A soil remediation system, comprising:
    an in-ground extraction well;
    a separation apparatus connected to receive extracted soil vapors from said extraction well and comprising a plurality of separation components, respective ones of said plurality of separation components adapted to separate a respective species contained in said extracted soil vapors, said plurality of separation components being connected in a succession to provide respective separated species flow streams of said respective species from the respective separation components;

wherein a first one of said separation components is adapted to separate a first one of said respective species from said extracted soil vapors;

a first dispersion apparatus comprising one of (a) an in-ground injection well or (b) an atmospheric vent, said first dispersion apparatus coupled to receive a species flow stream of a second one of said respective species from a second one of said separation components; and a second dispersion apparatus comprising one of (a) an in-ground injection well or (b) an atmosphere vent, said second dispersion apparatus coupled to receive the separated species flow stream of a third one of said respective species from a third one of said separation components.

20. The system of claim 19 further comprising:

a third dispersion apparatus comprising one of (a) an in-ground injection well or (b) an atmosphere vent, said third dispersion apparatus coupled to receive a residual gas flow stream of a fourth species from said third one of said separation components.

21. The system of claim 20 wherein:

said first species comprises water vapor and volatile organic compound gases;

said second species comprises one of nitrogen, carbon dioxide or oxygen;

said third species comprises another one of nitrogen, carbon dioxide or oxygen; and wherein said fourth species comprises the remaining one of nitrogen, carbon dioxide or oxygen.

22. The system of claim 19 further comprising a pump coupled to said first separation component.

23. A soil remediation system, comprising:

an in-ground extraction well;

a separation apparatus connected to receive extracted soil vapors from said extraction well and comprising a plurality of separation components, respective ones of said plurality of separation components adapted to separate a respective species contained in said extracted soil vapors, said plural separation components being connected in a succession to provide respective separated species flow streams of said respective species from the respective separation components;

wherein a first one of said plurality of separation components is adapted to separate a first one of said respective species from said extracted soil vapors;

a first dispersion apparatus comprising one of (a) an in-ground injection well or (b) an atmospheric vent, said first dispersion apparatus coupled to receive a species flow stream of a second one of said respective species from a second one of said separation components; and a second dispersion apparatus comprising one of (a) an in-ground injection well or (b) an atmosphere vent, said second dispersion apparatus coupled to receive a residual gas flow stream of a third and fourth species from said second one of said separation components.

24. A soil remediation system, comprising:

an in-ground extraction well;

a separation apparatus connected to receive extracted soil vapors from said extraction well and comprising first and second separation components, respective ones of said separation components adapted to separate a respective species contained in said extracted soil vapors, said first and second separation components being connected in a succession, respective ones of said separation components being adapted to provide a respective separated species flow stream of said respective species and a respective residual flow stream;

plural dispersers, each of said dispersers comprising one of (a) an in-ground injection well or (b) an atmospheric vent, respective ones of said plural dispersers being coupled to receive a respective one of: (a) a separated species flow stream (b) a residual flow stream, from one of said separation components.

25. A soil remediation system, comprising:

an in-ground extraction well;

a separation apparatus connected to receive extracted soil vapors from said extraction well and comprising a plurality of separation components, respective ones of said plurality of separation components adapted to separate a respective species contained in said extracted soil vapors, said plurality of separation components being connected in a succession, each one of said separation components adapted to provide a respective separated species flow stream of a respective species and a respective residual flow stream;

a plurality of dispersers, each of said dispersers comprising one of (a) an in-ground injection well or (b) an atmospheric vent, respective ones of said dispersers coupled to receive one of: (a) a separated species flow stream or (b) a residual flow stream, from a respective one of said separation components.

* * * * *